US005687137A

United States Patent [19]
Schmidt et al.

[11] Patent Number: 5,687,137
[45] Date of Patent: Nov. 11, 1997

[54] METHODS AND APPARATUS FOR ADAPTIVE OCEANOGRAPHIC SAMPLING

[75] Inventors: Henrik Schmidt, Norfolk; James G. Bellingham, Norwood, both of Mass.

[73] Assignee: Massachusetts Institute of Technology, Cambridge, Mass.

[21] Appl. No.: 746,286

[22] Filed: Jan. 10, 1996

Related U.S. Application Data

[63] Continuation of Ser. No. 584,969, Jan. 10, 1996, abandoned.

[51] Int. Cl.⁶ .................................................... H04B 11/00
[52] U.S. Cl. .......................... 367/131; 367/133; 367/134
[58] Field of Search ................................. 367/131, 133, 367/134, 117, 191, 13

[56] References Cited

U.S. PATENT DOCUMENTS

| 4,446,542 | 5/1984 | Beckerle | 367/131 |
| 4,805,160 | 2/1989 | Ishii et al. | 367/134 |
| 5,531,116 | 7/1996 | Chang et al. | 73/597 |

OTHER PUBLICATIONS

P.F. Worcester et al "A Review of Ocean Acoustic Tomography: 1987–1990", Rev. of Geophysics Supplement, pp. 557–570, Apr. 1991.

W. H. Munk et al. "Ocean Acoustic Tomography: A Acheme for Large Scale Monitoring", Deep Sea Research, vol. 26A, pp. 123–161, 1979.

T. B. Curtin, "Autonomous Oceanographic Sampling Networks", Oceanography, vol. 6, No. 3, pp. 86–93, 1993.

J. Bellingham et al. "A Small Long Range Autonomous Vehicle for Deep Ocean Exploration", Proc. 2nd 1992 Int. Offshore and Polar Engineering Conf., San Francisco, CA, Jun. 14–19, 1992.

J. Bellingham et al. "A Second Generation Survey AUV", Conf. Proc. AUV 94, IEEE, Jul. 19–20, 1994, Cambridge, MA.

C.S. Chiu et al. "Inverse Techniques for Coastal Acoustic Tomography", Environmental Acoustics, D. Lee and M. Schultz, ed., World Scientific, 1994.

R.C. Spindel, "Ocean Acoustic Tomography: A Review", Dept. Of Ocean Eng., Woods Hole Oceangraphic Institute, Woods Hole, Massachusetts, pp. 7–13.

J.G.W. Kelley et al. "Coupled Lake Erie Air–Sea, Storm Resolving Forecasts and Predictions, the Viento Project", Proc. ASCE Conf. 1994, pp. 202–215.

H.L. Dantzler Jr., et al. "An Expert System for Describing and Prediction the Coastal Ocean Johns Hopkins APL Tech. Digest", vol. 14, No. 2, 1993, pp. 181–192.

H. Schmidt et al. "Physics–Imposed Resolution and Robustness Issues in Seismo–Acoustic Parameter Inversion, Full Field Inversion Methods in Ocean and Seismo–Acoustics", Ed. O. Diaschok et al. Kluwer Acad. Publ., 1995, pp. 85–90.

(List continued on next page.)

*Primary Examiner*—Ian J. Lobo
*Attorney, Agent, or Firm*—Wolf, Greenfield & Sacks, P.C.

[57] ABSTRACT

An adaptive oceanographic sampling system includes several stationary acoustic tomography units distributed in an ocean volume, a processing and control system and at least one underwater vehicle movable within the ocean volume. Each of the acoustic tomography units includes an acoustic source for transmitting acoustic energy in the ocean volume, a receiver array for generating acoustic tomography data in response to received acoustic energy and a transmitter for transmitting the acoustic tomography data. The acoustic tomography data represents an ocean characteristic in the ocean volume. The processing and control system analyzes the acoustic tomography data and determines a region of interest within the ocean volume. The processing and control system then directs the underwater vehicle to move to the region of interest. The underwater vehicle includes a sensor for sensing an ocean parameter and providing sensor data representative of the ocean parameter in the region of interest. The underwater vehicle may include an acoustic source for transmitting acoustic energy to the receiver array of at least one of the acoustic tomography units.

26 Claims, 7 Drawing Sheets

OTHER PUBLICATIONS

A.B. Baggeroer et al. "Parameter Estimation Theory Bounds and the Accuracy of Full Field Inversions", Full Field Inversion Methods in Ocean and Seismo–Acoustics, Ed. O. Diaschok et al. Kluwer Acad. Publ., 1995, pp. 79–84.

A.B. Baggeroer et al. "Cramer–Rao Bounds for Matched Field Tomography and Ocean Acoustic Tomography", MIT, ATOC Occasional Notes, No. 27, Mar. 1995, pp. 1–5.

W. Munk, "How to Resolve Modes with Sparse Arrays", ATOC Occasional Notes, No. 29, Mar. 1995, pp. 1–2.

K. Curtis et al. "ATOC Ambient Noise Measurements", ATOC Occasional Notes, No. 28, Mar. 1995, pp. 1–4.

METHODS AND APPARATUS FOR ADAPTIVE OCEANOGRAPHIC SAMPLING

This application is a continuation of application Ser. No. 08/584,969, filed Jan. 10, 1996 now abandoned.

FIELD OF THE INVENTION

This invention relates to oceanographic measurement technology and, more particularly, to adaptive oceanographic sampling methods and apparatus which provide spatial and temporal coverage, as well as resolution.

BACKGROUND OF THE INVENTION

Oceanographic measurements play an important role in all aspects of ocean science and engineering. Typical applications in applied marine science and engineering include mapping of pollutant transport, environmental monitoring, search for pollution sources, national security, search and rescue, marine geophysics, resource exploration and resource production. In basic marine science, oceanographic measurements are a key component, together with modeling, of the development of the fundamental understanding which subsequently provides the basis for engineering, management and policy solutions.

A common problem for all these applications of marine measurements is the fact that they have become extremely platform limited. The performance/cost ratio has grown exponentially for the computer and technology used for modeling and analysis, but has been diminishing or, at best, unchanged in terms of the platforms. Most oceanographic measurements are still performed from ships.

The development of inexpensive autonomous underwater vehicle technology has provided a breakthrough in terms of performance/cost ratio, with the potential for revolutionizing the area of experimental oceanography in deep as well as shallow water. The concept of autonomous oceanographic sampling networks (AOSN) provides a particularly powerful technology. However, the AOSN technology has its inherent limitations because of its particular functionality.

A fundamental problem facing oceanographic measurement techniques is a trade-off between coverage and resolution. A measurement system may cover a large area, but only be able to produce results over a very coarse grid in space and time. This is the case for ship-based collection of water samples. Other measurement techniques are highly accurate and capable of measuring small spatial and temporal variations, but are limited to cover only a very small volume. An extreme example of such a measurement is the use of a microscope. In general, the common methods applied in oceanography provide a compromise between the two extremes. While a wide variety of oceanographic measurement techniques exist, none is capable of simultaneously providing wide area coverage of the entire water column and high resolution.

Acoustic tomography is a spin-off of the acoustic methods developed for anti-submarine warfare. It uses the fact that sound speed is strongly dependent on temperature, salinity and pressure, properties which can therefore be inferred in an ocean volume by analysis of acoustic transmissions within the source-receiver network deployed in the volume. Typically, a tomography network includes five or six vertical receiver arrays spanning the water column. Each array has an acoustic source transmitting a coded sequence to the other arrays. The analysis is performed by simulating the received signals using a propagation model, the input parameters of which are varied to reproduce the measured data. Acoustic tomography provides coverage in the vertical slices between the sources and receivers, but virtually no information about regions between the slices. The spatial resolution of acoustic tomography is very limited, typically on the order of 100 meters in the horizontal direction and 10 meters in depth. The main advantage is the coverage in terms of frequent snapshots, allowing for tracking of oceanographic dynamics. Acoustic tomography is described, for example, by P. F. Worcester et al., in "A Review of Ocean Acoustic Tomography: 1987–1990", *Reviews of Geophysics, Supplement*, pp. 557–570, April, 1991 and by W. H. Munk et al in "Ocean Acoustic Tomography: A Scheme For Large Scale Monitoring", *Deep Sea Research*, Vol. 26A, pp. 123–161, 1979.

The autonomous ocean sampling network employs moored buoys which function as network nodes for a long-term multiple underwater vehicle presence in the ocean. The objective is to provide an economically feasible capability for repeated synoptic characterization of large scale oceanographic phenomenon. The key to such a system is a small, low cost autonomous underwater vehicle which can be operated reliably over extended, unattended deployments at sea. The vehicles traverse the network recording temperature, salinity, velocity and other data, relaying key observations to the network nodes in real time and transferring more complete data sets after docking at a node. Each network node consists of a base buoy or mooring containing an acoustic beacon, an acoustic modem, point sensors, an energy source and one or more autonomous underwater vehicle (AUV) docks. The motivation for multiple vehicle surveys is that the quality and utility of the data obtained improves much faster than the number of vehicles for large scale dynamic ocean phenomenon. Autonomous oceanographic sampling networks are described, for example, by T. B. Curtin in "Autonomous Oceanographic Sampling Networks", *Oceanography*, Vol. 6, No. 3, 1993, pp. 86–93.

SUMMARY OF THE INVENTION

According to the present invention, an adaptive oceanographic sampling system is provided. The system comprises a plurality of stationary acoustic tomography units distributed in an ocean volume. Each of the acoustic tomography units includes an acoustic source for transmitting acoustic energy in the ocean volume and a receiver array for generating acoustic tomography data in response to received acoustic energy. The acoustic tomography data represents an ocean characteristic in the ocean volume. Each of the acoustic tomography units further includes a transmitter for transmitting the acoustic tomography data. The adaptive oceanographic sampling system further, comprises a processing and control system for analyzing in real-time the acoustic tomography data transmitted by the acoustic tomography units and determining a region of interest within the ocean volume, and for generating a control signal identifying the region of interest. The system further comprises one or more underwater vehicles each including a propulsion system responsive to the control signal for moving the underwater vehicle to the region of interest. Each underwater vehicle includes a sensor for sepsing an ocean parameter and providing sensor data representative of the ocean parameter in the region of interest. The stationary acoustic tomography units permit sampling of the ocean characteristic over a relatively large ocean volume, and the one or more underwater vehicles permit high resolution sampling of the ocean parameter in the region of interest within the ocean volume.

The one or more underwater vehicles may each include an acoustic source for transmitting acoustic energy to the receiver array of at least one of the stationary acoustic tomography units. The one or more underwater vehicles may each also include an acoustic receiver for receiving acoustic energy transmitted from the acoustic source of at least one of the acoustic tomography units. This configuration permits collection of acoustic tomography data in different parts of the ocean volume as the underwater vehicle moves through the ocean volume.

The underwater vehicle is typically powered by batteries. For long-term deployments of the system, one or more of the stationary acoustic tomography units may include a docking unit for recharging of batteries and data unloading. The underwater vehicle may include means for storing the sensor data and for transferring the stored sensor data to the acoustic tomography unit. The acoustic tomography unit may include means for transmitting the sensor data to the processing and control system.

The processing and control system preferably controls the position of the underwater vehicle at a rate that is greater than the rate of variation of the ocean characteristic. Typically, the region of interest varies with time.

According to another aspect of the invention, a method for adaptive oceanographic sampling is provided. According to the method, a plurality of stationary acoustic tomography units and at least one underwater vehicle are deployed in an ocean volume, and acoustic energy is transmitted from each of the acoustic energy units. A receiver array on each of the acoustic tomography units receives acoustic energy from one or more of the other acoustic tomography units and generates acoustic tomography data representative of an ocean characteristic in the ocean volume. The acoustic tomography data is transmitted from the acoustic tomography units to a processing and control system, which analyzes the acoustic tomography data and determines a region of interest within the ocean volume. The processing and control system directs the underwater vehicle to move to the region of interest. A sensor on the underwater vehicle senses an ocean parameter in the region of interest and provides sensor data representative of the ocean parameter in the region of interest. Acoustic energy may be transmitted from the underwater vehicle to the receiver array of one or more of the acoustic tomography units.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
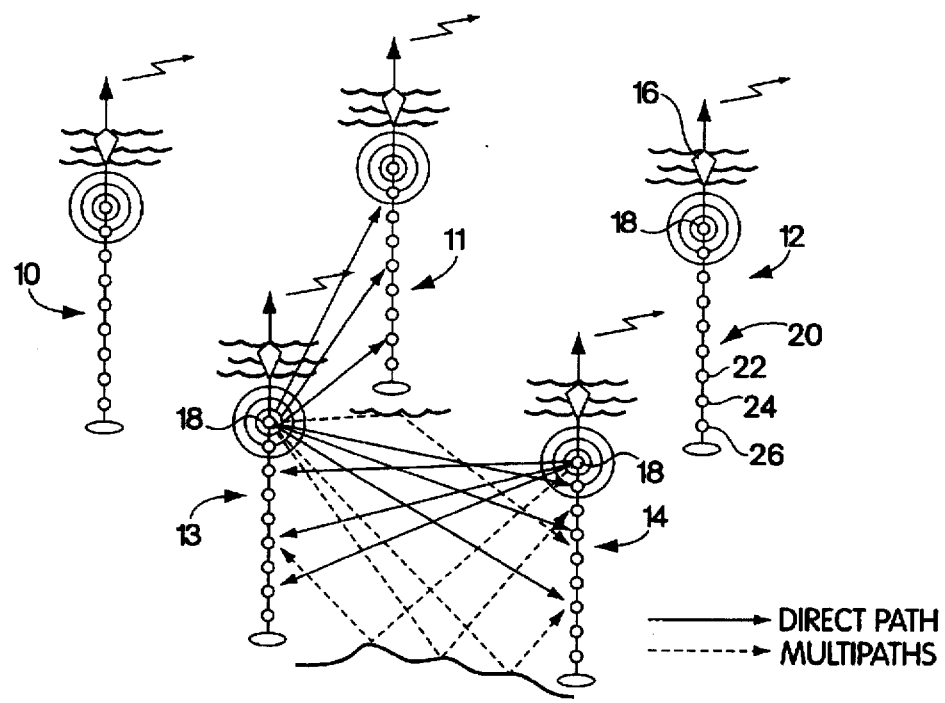
FIG. 1 is a pictorial diagram of an acoustic tomography system for oceanographic measurement in accordance with the prior art.

A prior art acoustic tomography system for oceanographic measurement is shown in FIG. 1. The system includes acoustic tomography units 10, 11, 12, 13 and 14 distributed in an ocean area. Each acoustic tomography unit includes a buoy 16 having suspended therefrom an acoustic source 18 and a vertical receiver array 20 including receiver elements 22, 24, 26, etc. Each acoustic tomography unit 10, 11, 12, 13 and 14 also includes a wireless modem which is used to transmit acoustic tomography data to a remote system.

In operation, each acoustic source 18 transmits a coded sequence of acoustic energy, which is received by the vertical receiver array 20 on each of the other tomography units. The acoustic energy received by each of the receiver elements includes energy that followed a direct path from the acoustic source to the receiver element and multipath energy that was reflected by various elements in the ocean volume. The acoustic energy received by each vertical receiver array is representative of a slice of the ocean volume between the acoustic source and the vertical receiver array. The acoustic energy received by each vertical receiver array 16 is converted by circuitry in the acoustic tomography unit to acoustic tomography data, which is transmitted by the wireless modem to the remote system for storage and analysis.

Figure 2:
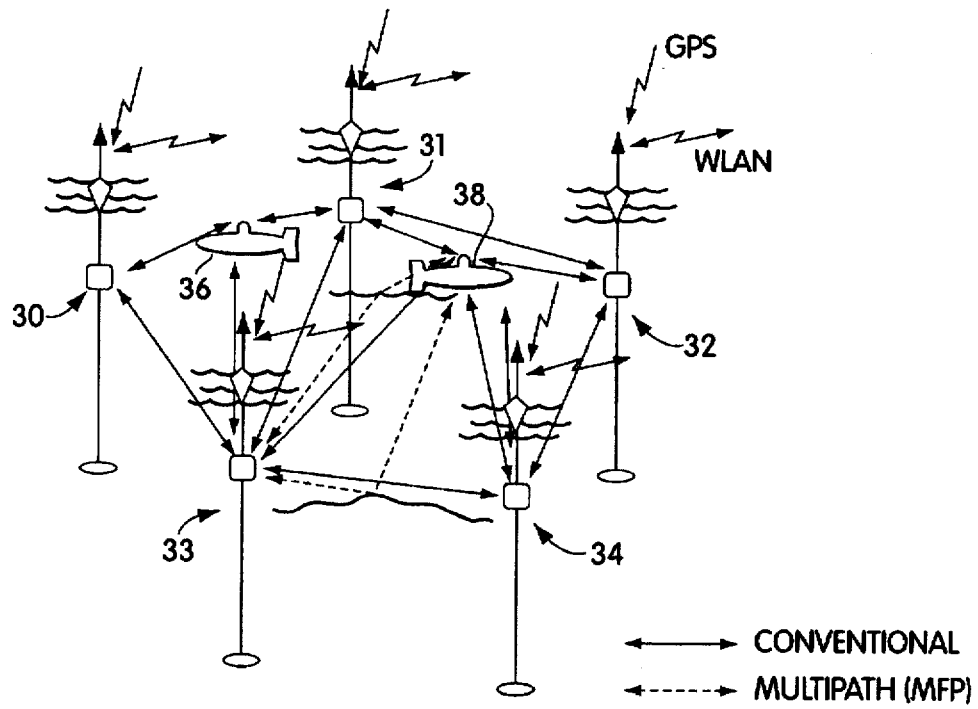
FIG. 2 is a pictorial diagram of an autonomous oceanographic sampling network in accordance with the prior art.

An autonomous oceanographic sampling network in accordance with the prior art is shown in FIG. 2. The system includes network nodes 30, 31, 32, 33 and 34, and one or more autonomous underwater vehicles (AUV's) 36 and 38. The vehicles 36 and 38 traverse the network, recording temperature, salinity, velocity and other data. Key observations are relayed from the vehicles to the network nodes in real time, and more complete data sets are transferred when the vehicles are docked at a network node. Each network node 30, 31, 32, 33 and 34 includes a base buoy, or mooring, containing an acoustic beacon, an acoustic modem for communicating with the AUV's, point sensors, an energy source and one or more AUV docks. A central system, located on one of the network nodes, on a ship and/or on shore, processes the sampled data in real time or near real time to guide vehicle sampling.

Figure 3:
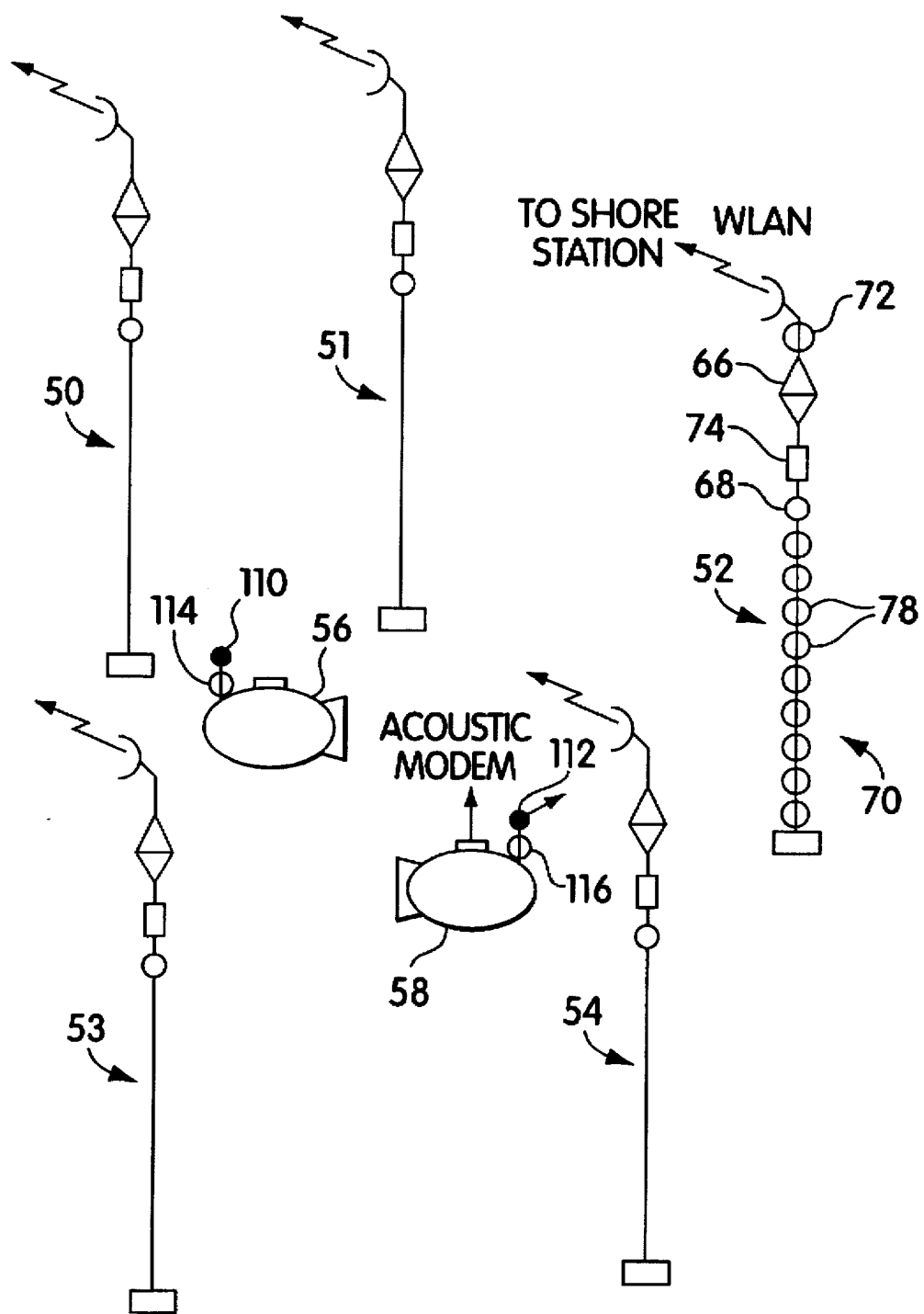
FIG. 3 is a pictorial diagram of an adaptive oceanographic sampling system in accordance with the present invention.
Figure 4:
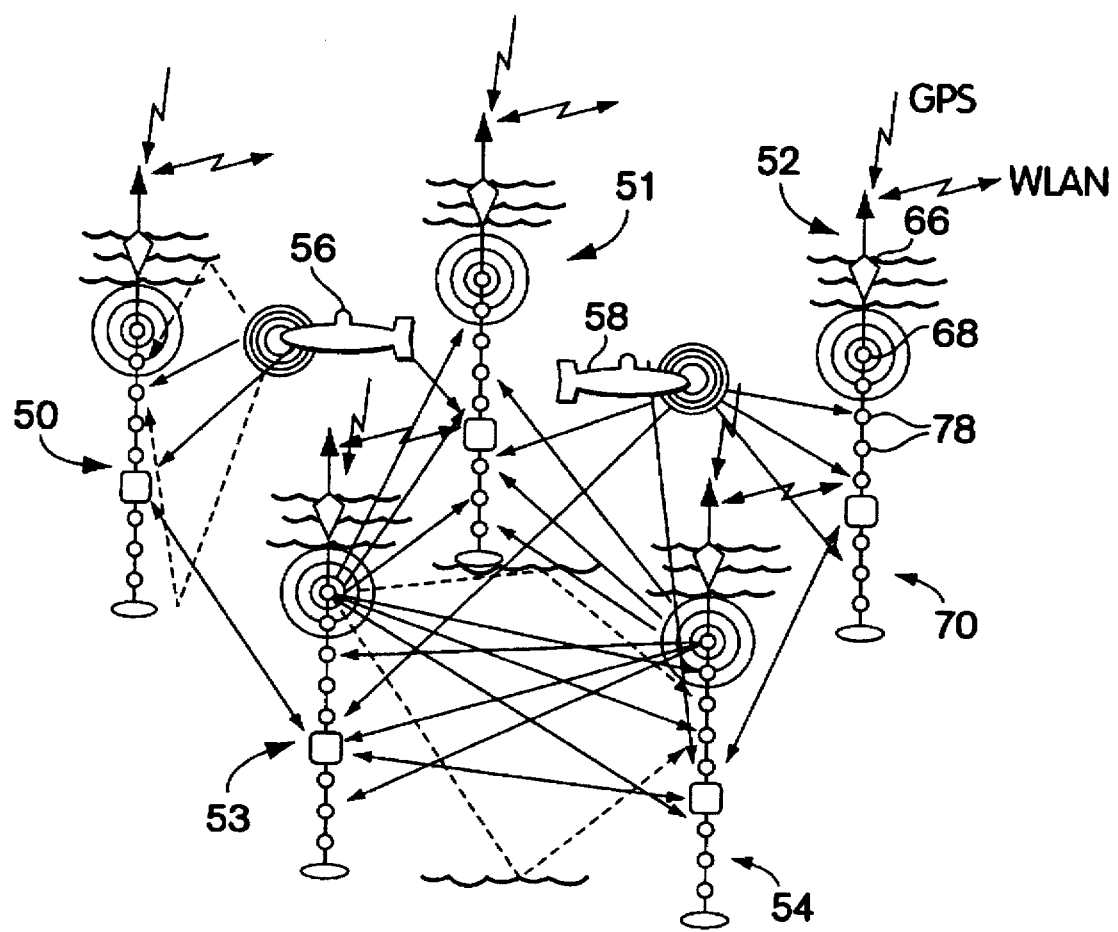
FIG. 4 is a pictorial diagram of the adaptive oceanographic sampling system of FIG. 3, illustrating the operation thereof.

An adaptive oceanographic sampling system in accordance with the present invention is shown in FIGS. 3 and 4. The principal components of the system include a plurality of acoustic tomography units 50, 51, 52, 53 and 54, one or more autonomous underwater vehicles 56 and 58 and a processing and control system 60 (shown in FIG. 6). The processing and control system 60 may be located on shore, on a ship or may be associated with one of the acoustic tomography units. In general, the acoustic tomography units 50, 51, 52, 53 and 54 acquire acoustic tomography data and provide the acoustic tomography data to the processing and control system 60. The processing and control system analyzes the acoustic tomography data and determines a region of interest within the volume monitored by the acoustic tomography units, based on a predetermined criteria. For example, the region of interest may be a region where an ocean parameter value is within a given range or a region of high spatial gradient of an ocean parameter. The processing and control system 60 generates control signals for directing one or both of the AUV's 56 and 58 to the region of interest.

The AUV samples one or more ocean parameters in the region of interest and forwards the sampled ocean parameter data to the processing and control system. The processing and control system thereby receives acoustic tomography data representative of a relatively large ocean volume and receives sampled ocean parameter data from a region of interest with relatively high resolution. The region of interest is determined in real time or near real time and may change dynamically.

The acoustic tomography units 50, 51, 52, 53 and 54 are distributed in an ocean area being studied. When five acoustic tomography units are utilized, the area covered by the system is typically about 10 to 30 square kilometers. The spacing between acoustic tomography units is selected such that each acoustic tomography unit receives acoustic energy of sufficient intensity for processing from at least one, and preferably several or all, other acoustic tomography units. It will be understood that more or fewer acoustic tomography units may be utilized within the scope of the present invention. Each of the acoustic tomography units includes a buoy 66 from which the components of the unit are suspended, an acoustic source 68, a vertical receiver array 70 and a wireless modem 72 for communicating with the processing control system 60. Each acoustic tomography unit may also include an acoustic modem 74 for communicating with the underwater vehicles 56 and 58. In a preferred embodiment, the acoustic source 68 operates at a frequency of about 1 kHz, and the vertical receiver array 70 has 16 receiver elements 78. However, different acoustic frequencies and different numbers of receiver elements may be utilized.

One or more of the acoustic tomography units may include docking facilities for the underwater vehicles 56 and 58. The docking facilities typically include a dock for attachment to the underwater vehicle and a power source for recharging the batteries of the underwater vehicle. The docking facility may also include a data storage device for receiving and storing data that was temporarily stored in the underwater vehicle. The underwater vehicle data is subsequently transmitted via the wireless modem 72 to the processing and control system.

In an alternative configuration, one or more communication and docking buoys separate from the acoustic tomography units are provided. The communication and docking buoys are similar to the network nodes 30, 31, 32, 33 and 34 shown in FIG. 2 and described above. Each communication and docking buoy typically includes a dock for attachment of the underwater vehicle, a system for recharging the batteries in the underwater vehicle and a system for storage and transmission of data acquired by the underwater vehicle.

Figure 5:
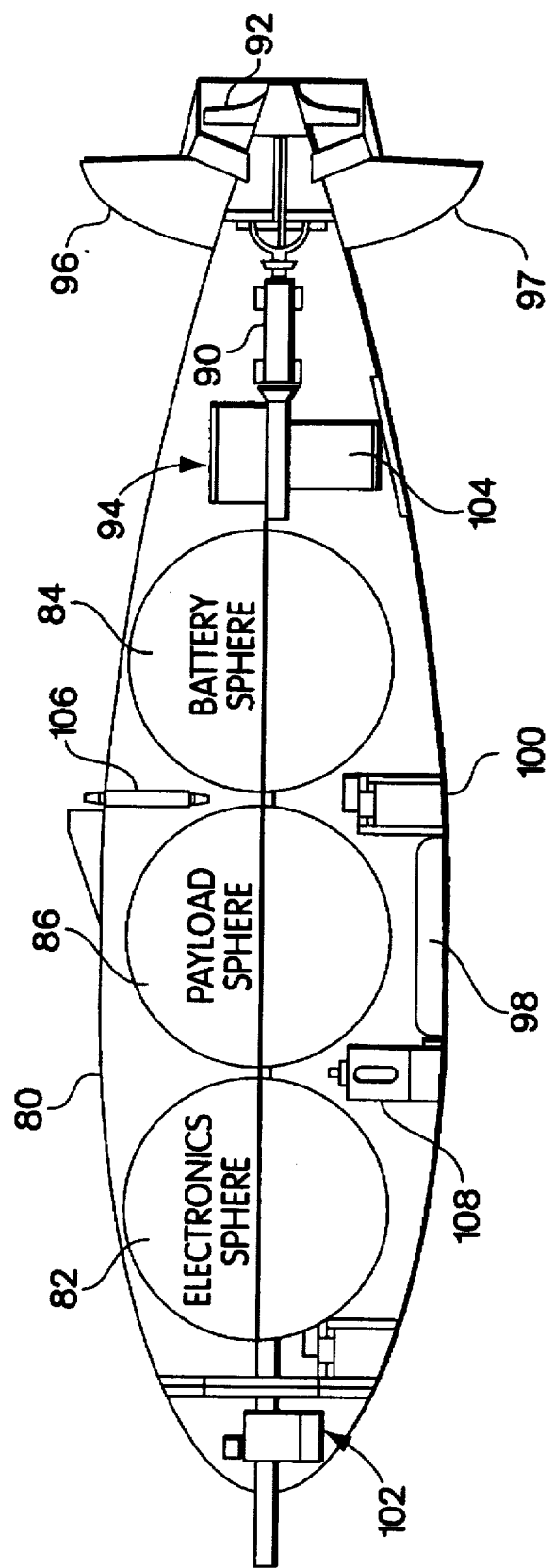
FIG. 5 is a schematic cross-sectional diagram of an example of an autonomous underwater vehicle suitable for use in the adaptive oceanographic sampling system of the present invention.

An example of a small, high-performance, propeller-driven underwater vehicle suitable for use in the adaptive oceanographic sampling system is shown in FIG. 5. The vehicle is 2.1 meters long, has a maximum diameter of 0.6 meter and is rated to a depth of 6700 meters. A flooded plastic shell 80 provides a low drag hull. Inside the hull are one or more standard glass instrumentations spheres used for ocean work. The underwater vehicle may include an electronics sphere 82, a battery sphere 84 and a payload sphere 86. A propulsion system of the underwater vehicle includes an oil-filled motor 90, a propeller 92, an oil-filled junction box 94, rudders 96 and 97, lead ballast 98 and an emergency drop weight 100. The underwater vehicle may further include cameras 102 and 104, a turbidity sensor 106, an altimeter 108 and any other sensors of interest. The vehicle typically includes sensors for sensing temperature, conductivity and pressure. The electronics sphere 82 includes circuitry for storing data acquired from the sensors, an acoustic modem for communicating with the processing and control system through an acoustic modem on one of the acoustic tomography units and circuitry for controlling motor 90 and rudders 96 and 97 in response to the control signals received from the processing and control system. The vehicle is autonomous in the sense that it may move to any x, y coordinates and depth within the ocean volume being monitored, provided that it remains within range of the acoustic tomography units and/or the docking buoys. Underwater vehicles of this type are described in more detail by J. Bellingham et al in "A Small Long Range Autonomous Vehicle For Deep Ocean Exploration", *Proc. 2nd 1992 Int. Offshore and Polar Engineering Conf.*, San Francisco, Calif., Jun. 14–19, 1992 and by J. Bellingham et al in "A Second Generation Survey AUV", *Conf. Proc. AUV 94*, IEEE, July 19–20, 1994, Cambridge, Mass. It will be understood that different underwater vehicle configurations may be utilized within the scope of the present invention.

In accordance with an important aspect of the invention, one or both of the underwater vehicles 56 and 58 may be equipped with an acoustic source. As schematically shown in FIG. 3, underwater vehicle 56 is equipped with an acoustic source 110, and underwater vehicle 58 is equipped with an acoustic source 112. The acoustic sources 110 and 112 are similar to the acoustic source 68 in each of the acoustic tomography units and are utilized as acoustic tomography sources. In particular, each acoustic source 110 and 112 transmits a coded acoustic signal suitable for reception by the vertical receiver array 70 on each of the acoustic tomography units. In the example given above, the acoustic sources 110 and 112 transmit at a frequency of about 1 kHz. The underwater vehicles 56 and 58 may also be equipped with acoustic receivers 114 and 116, respectively, for receiving acoustic energy transmitted from the source of at least one of the acoustic tomography units. The acoustic energy received by each of the vertical receiver arrays and by the receivers 114 and 116 represents ocean characteristics in a slice between the underwater vehicle and the acoustic tomography unit. Because the underwater vehicle travels to different locations relative to each of the acoustic tomography units, acoustic tomography data can be acquired from different slices of the ocean volume as the underwater vehicle travels from point to point. Optimal travel paths for the underwater vehicle equipped with a tomography source and/or receiver are determined adaptively through real-time processing of the acoustic tomography data. By contrast, in prior art acoustic tomography systems, the acoustic sources and receivers were either fixed on each of the stationary acoustic tomography units or were towed by surface ships. The ability to acquire and process acoustic tomography data in real-time was limited, not allowing for use of the tomography data for adaptive change of source-receiver positions. As described below, the underwater vehicles 56 and 58 can be directed to a region of interest so as to acquire data within the region of interest.

Figure 6:
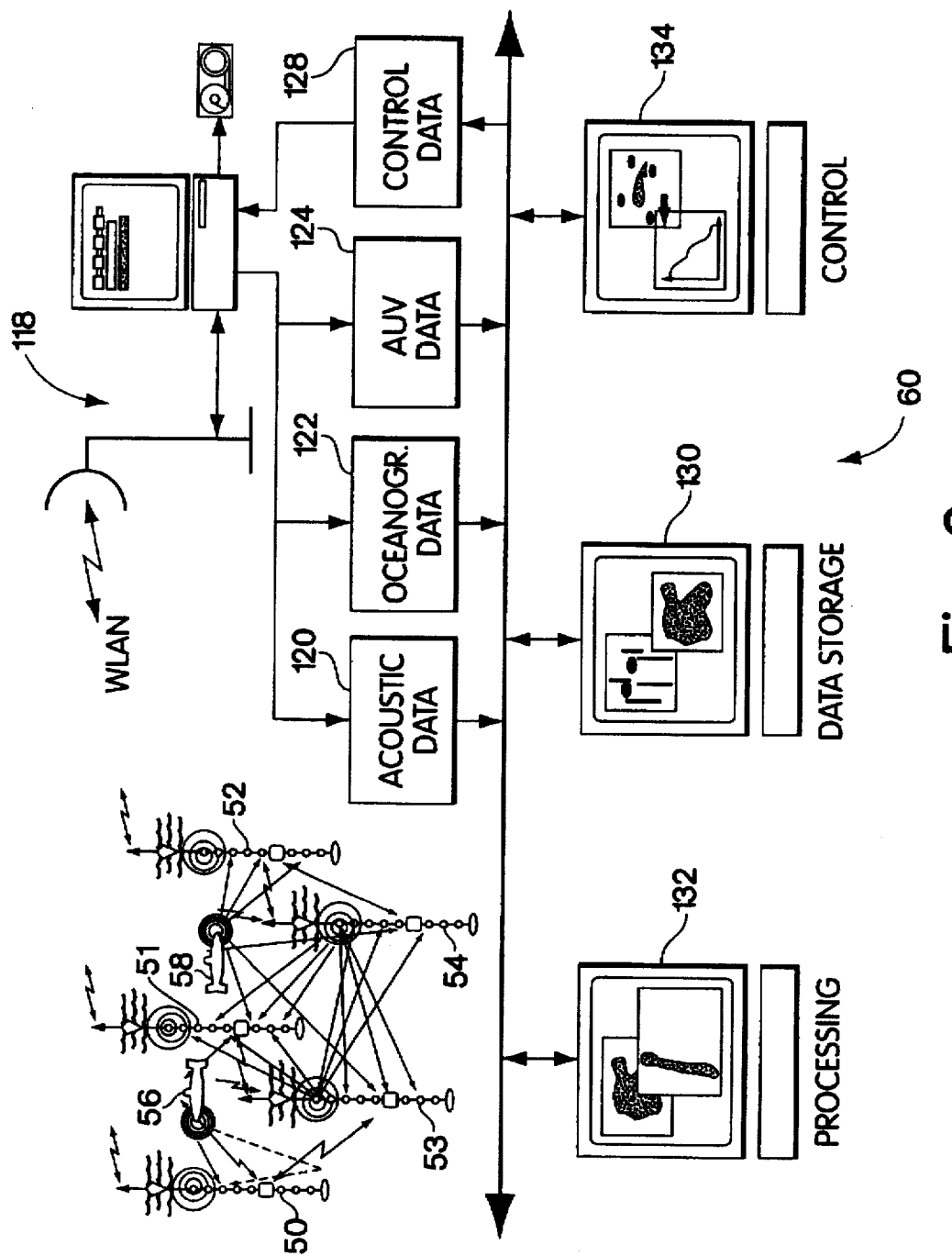
FIG. 6 is a pictorial block diagram of the adaptive oceanographic sampling system, illustrating the network architecture.

A simplified block diagram of the processing and control system 60 is shown in FIG. 6. The processing and control system may be located on shore or on a ship. Alternatively, the processing and control system may be underwater vehicles. When the processing and control system 60 is remotely located from the ocean sampling area, the system preferably communicates with the acoustic tomography units through a Local Area Network (LAN) connection. This connection may be a wireless LAN (WLAN) as shown in FIG. 6, but may for short distances be replaced by a fiber optic cable connection. The communication between the system 60 and the underwater vehicles is performed through a wireless acoustic modem. A communication station 118 including a wireless modem is positioned within range of the ocean area in which acoustic tomography units 50, 51, 52, 53 and 54 and underwater vehicles 56 and 58 are located. The link between the communication station 118 and the remainder of the processing and control system 60 may be a direct link, may be a link through the Internet or may use a dial up telephone line. The system receives acoustic data 120 and oceanographic data 122 from the acoustic tomography units 50, 51, 53 and 54, and receives AUV data 124 from the underwater vehicles 56 and 58. The system provides control data 128 to the underwater vehicles 56 and 58 for controlling their positions within the survey area. The processing and control system 60 includes a data storage module 130, a processing module 132 and a control module 134. The modules 130, 132 and 134 may be implemented as one or more microprocessors having suitable disk storage capacity in a network configuration. The data storage module 130 stores the acoustic data 120, the oceanographic data 122 and the AUV data 124 for subsequent analysis. The processing module 132 analyzes the received data to control the movement of the underwater vehicles 56 and 58 in real time or near real time. The processing module 132 may also perform more detailed analysis of the received data if desired. The control module 134 controls the operation of the underwater vehicles 56 and 58 based on the results of the analysis by processing module 132.

Figure 7:
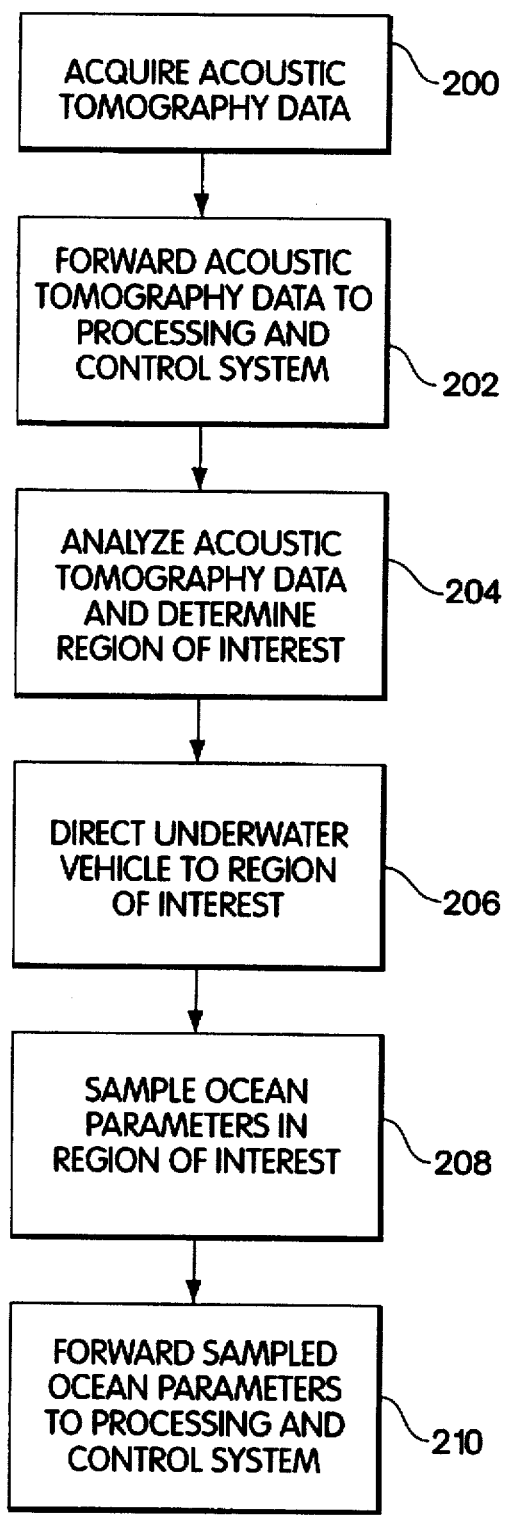
FIG. 7 is a flow diagram showing the operation of the adaptive oceanographic sampling system of the present invention.

Operation of the adaptive oceanographic sampling system of the present invention is described with reference to the flow diagram of FIG. 7. Initially, acoustic tomography data is acquired in step 200. The acoustic tomography data is acquired by the receiver array 70 on each of the acoustic tomography units 50, 51,52, 53 and 54. The acoustic energy received by each receiver array may be transmitted by the acoustic source 68 on other tomography units or by the acoustic sources 110 and 112 on underwater vehicles 56 and 58, respectively. The acoustic energy received by each receiver element is converted to acoustic tomography data using well-known signal processing and sampling techniques. The acoustic tomography data may be stored temporarily by each of the tomography units and is forwarded via the wireless modem 72 to the processing and control system 60 in step 202. The data transmitted to the processing and control system 60 may also include data from sensors located on the acoustic tomography unit, which may sense temperature, conductivity, pressure or any other parameters of interest. In step 204, the processing and control system 60 analyzes the acoustic tomography data received from the acoustic tomography units and determines a region of interest within the volume being surveyed by the acoustic tomography units. Techniques for extracting ocean characteristics from acoustic tomography data are described, for example, by C. S. Chiu et al in "Inverse Techniques For Coastal Acoustic Tomography", *Environmental Acoustics.*, D. Lee and M. Schultz, ed., World Scientific, 1994. The region of interest may be selected as a region where one or more parameters is within a given range or as a region of high spatial gradient of a particular parameter, such as salinity or current. In general, any desired criteria can be used for selecting the region of interest. When the information derived from the acoustic tomography data satisfies the criteria in a particular region, that region is identified as the region of interest. The region of interest is a portion of the ocean area being surveyed where more detailed information or higher resolution information is desired.

In step 206, the processing and control system 60 sends control signals to one or both of the underwater vehicles 56 and 58 to direct them to the region of interest. The control signals are transmitted via the wireless modem in the communication station 118 to one of the tomography units and then to the underwater vehicle using the acoustic modem. The control signals may, for example, direct the underwater vehicle to pass through the region of interest at a prescribed velocity or to follow a prescribed path within the region of interest. The underwater vehicle samples one or more ocean parameters in the region of interest in step 208. For example, the underwater vehicle may sample temperature, conductivity and pressure within the region of interest. In addition, the acoustic source on the underwater vehicle may be energized so that the acoustic tomography units 50, 51, 52, 53 and 54 may acquire acoustic tomography data that is representative of the region of interest.

In general, the underwater vehicle may include any desired ocean parameter sensor and may include an acoustic source and/or an acoustic receiver as described above. When the adaptive oceanographic sampling system includes more than one underwater vehicle, the vehicles may be directed to follow different paths at the same or different depths in the region of interest. Alternatively, a first vehicle may take measurements in the region of interest, while a second vehicle may take measurements in other parts of the ocean volume being surveyed. In another approach, the processing and control system determines a different region of interest for each underwater vehicle. Where the sensors on the underwater vehicle are controllable, the processing and control system may transmit sensor control signals to the underwater vehicle for optimizing the measurements within the region of interest.

In step 210, the ocean parameters sampled by the underwater vehicle in the region of interest are forwarded to the processing and control system 60. The forwarding of sampled ocean parameters may occur immediately through the acoustic modem 74 and the wireless modem 72 or may occur when the underwater vehicle docks at a docking station. In this case, the sampled ocean parameter data is transmitted to the processing and control system by a wireless modem on the docking station. In addition, the acoustic tomography units transmit the acoustic tomography data resulting from acoustic energy transmitted by the acoustic source on the underwater vehicle. As a result, the adaptive oceanographic sampling system acquires acoustic tomography data over a relatively large ocean volume defined by the coverage of the acoustic tomography units and acquires sampled ocean parameter data in a region of interest which is relatively small in comparison with the ocean volume covered by the acoustic tomography units. Thus, the system of the invention simultaneously provides wide area coverage and high resolution in the region of interest.

The region of interest is defined by x,y coordinates and by depth. Thus, the underwater vehicle may be directed to a region of interest at a particular depth where a condition of interest exists. Furthermore, the region of interest may vary with time as, for example, when a front advances through the ocean area being studied. In this case, the underwater vehicle may be directed to travel with the moving region of interest in order to sample parameters of interest over a period of time. In order to meet this requirement, the response time of the adaptive oceanographic sampling system must be less than the rate of movement of the region of interest. The response time of the system includes the time required by the acoustic tomography units to acquire data, the time required to transmit the data to the processing and control system, the time required by the processing and control system to analyze the acoustic tomography data and determine a region of interest, the time required for the processing and control system to forward control signals to the underwater vehicle and the time required by the underwater vehicle to travel to the region of interest. When two or more underwater vehicles are utilized, the processing and control system 60 may utilize different criteria for determining the region of interest of each underwater vehicle. Thus, different underwater vehicles may sample the same or different ocean parameters in the same or different regions of interest.

The fundamental advantage of adaptive sampling in accordance with the invention is to increase survey efficiency by concentrating measurements in regions of interest. Thus, to map an ocean front, a coarse survey may be run to provide coverage and to localize the front. In the case where the phenomenon is static or slowly varying, the same underwater vehicle will then subsequently concentrate operations in the front vicinity. Substantial savings can be realized, both in terms of expended energy and in terms of time required to complete a measurement series. Energy savings is important, as energy storage has long been a problem for a remote oceanographic systems. Time savings provides a way to substantially improve the system effectiveness, since most oceanographic phenomena evolve in time. For a survey to be synoptic, there is a certain minimum time in which the measurement must be completed to be meaningful (the time constrained survey problem). In a coastal environment, tidal forcing may dictate a six hour completion time or less. The net effect of adaptive sampling is to reduce the required distance traveled to characterize a given volume, allowing use of more efficient survey speeds, or enabling larger volumes to be surveyed.

In dynamic environments, it is beneficial to perform the adaptive sampling using multiple underwater vehicles such that the first vehicle continues its survey mission after it encounters a phenomenon, such as a front requiring high resolution mapping, and instructing the network to have another underwater vehicle focus on the phenomenon.

Figure 8:
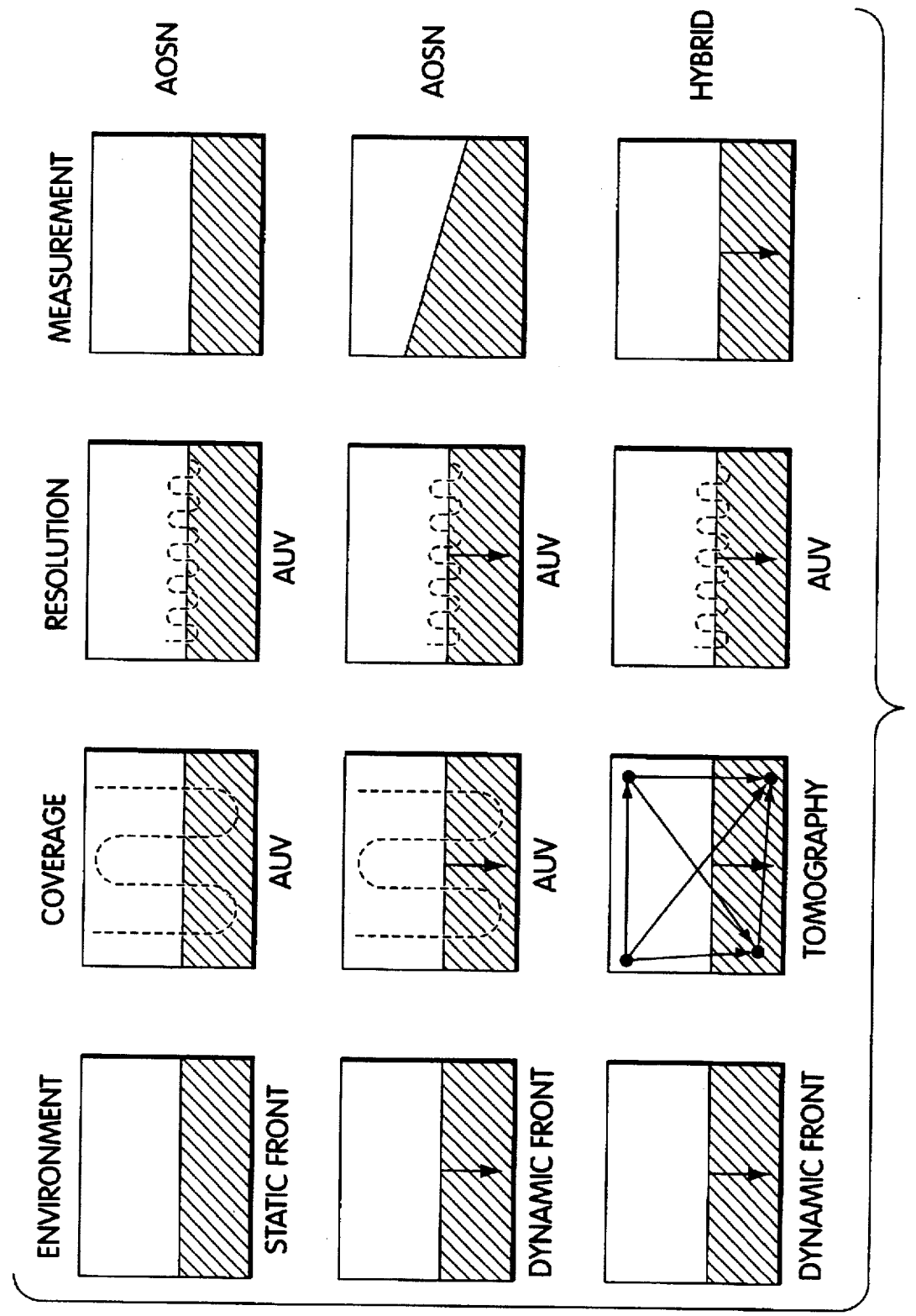
FIG. 8 is a schematic representation of adaptive sampling by autonomous oceanographic sampling networks and by adaptive oceanographic sampling systems in accordance with the invention.

Even with multiple vehicles, there is a fundamental limitation to the autonomous oceanographic sampling networks in dynamic environments. This is illustrated in the second row of FIG. 8. A front is moving at a finite speed. The underwater vehicle encounters the front several times but cannot, unless it remains in the same position, determine whether the front is moving or is oriented at an angle with respect to the vehicle movement, as shown to the right. The same is the case when the vehicle is performing high resolution mapping. As a result, the AOSN-based measurement cannot properly distinguish between temporal and spatial variation. By contrast, the operation of the adaptive oceanographic sampling system of the present invention is illustrated in the bottom row of FIG. 8. The acoustic tomography units provide coverage on a large scale, yielding a coarse measurement of the frontal dynamics. An underwater vehicle is then adaptively instructed to focus its measurement on the front or other region of high spatial variability.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An adaptive oceanographic sampling system comprising:
a plurality of stationary acoustic tomography units distributed in an ocean volume, each of said acoustic tomography units including an acoustic source for transmitting acoustic energy in said ocean volume, a receiver array for generating acoustic tomography data in response to received acoustic energy, said acoustic tomography data representing an ocean characteristic in said ocean volume, and a transmitter for transmitting said acoustic tomography data;
a processing and control system for analyzing the acoustic tomography data transmitted by said acoustic tomography units and determining a region of interest within said ocean volume, and for generating a control signal representative of said region of interest; and
at least one underwater vehicle including a propulsion system responsive to said control signal for moving said underwater vehicle to said region of interest, said underwater vehicle further including a sensor for sensing an ocean parameter and providing sensor data representative of the ocean parameter in said region of interest.

2. An adaptive oceanographic sampling system as defined in claim 1 wherein said underwater vehicle includes a vehicle acoustic source for transmitting acoustic energy to the receiver array of at least one of said acoustic tomography units.

3. An adaptive oceanographic sampling system as defined in claim 1 wherein said underwater vehicle includes an acoustic receiver for receiving acoustic energy transmitted from the acoustic source of at least one of said acoustic tomography units.

4. An adaptive oceanographic sampling system as defined in claim 1 wherein the propulsion system of said underwater vehicle includes means responsive to said control signal for moving said underwater vehicle to different depths and locations in said ocean volume.

5. An adaptive oceanographic sampling system as defined in claim 1 wherein said underwater vehicle includes batteries for powering said propulsion system and wherein at least one of said stationary acoustic tomography units includes a dock for docking said underwater vehicle and for recharging said batteries.

6. An adaptive oceanographic sampling system as defined in claim 5 wherein said underwater vehicle includes means for storing said sensor data and means for transferring said stored sensor data to said one of said acoustic tomography units when said underwater vehicle is attached to said dock.

7. An adaptive oceanographic sampling system as defined in claim 1 wherein said transmitter comprises a wireless modem for transmitting said acoustic tomography data to said processing and control system.

8. An adaptive oceanographic sampling system as defined in claim 1 wherein at least one of said stationary acoustic tomography units includes an acoustic modem for communicating with said underwater vehicle.

9. An adaptive oceanographic sampling system as defined in claim 1 wherein said receiver array comprises a vertical array of acoustic receivers.

10. An adaptive oceanographic sampling system as defined in claim 1 wherein said processing and control system controls the position of said underwater vehicle at a rate that is greater than a rate of variation of said ocean characteristic.

11. An adaptive oceanographic sampling system as defined in claim 10 wherein said region of interest varies with time.

12. An adaptive oceanographic sampling system as defined in claim 1 wherein the sensor on said underwater vehicle includes means for sensing temperature, conductivity and pressure in the region of interest.

13. An adaptive oceanographic sampling system as defined in claim 1 wherein said processing and control system determines said region of interest based on a relatively high spatial gradient of the ocean characteristic represented by said acoustic tomography data.

14. An adaptive oceanographic sampling system as defined in claim 1 wherein the ocean characteristic represented by said acoustic tomography data is within a given range in said region of interest.

15. An adaptive oceanographic sampling system as defined in claim 1 wherein said underwater vehicle includes means for sensing said ocean parameter at a plurality of points within said region of interest.

16. An adaptive oceanographic sampling system as defined in claim 1 wherein said processing and control system is remotely located from said underwater vehicle.

17. An adaptive oceanographic sampling system as defined in claim 1 further including at least one communication and docking buoy positioned in said ocean volume for docking of said underwater vehicle, for providing power to said underwater vehicle and for communication with said underwater vehicle.

18. A method for adaptive oceanographic sampling, comprising the steps of:
deploying a plurality of stationary acoustic tomography units and at least one underwater vehicle in an ocean volume;
transmitting acoustic energy from each of said acoustic tomography units;
receiving acoustic energy from one or more of the other acoustic tomography units with a receiver array on each of said acoustic tomography units and generating acoustic tomography data representative of an ocean characteristic in said ocean volume;
transmitting said acoustic tomography data from said acoustic tomography units to a processing and control system;
said processing and control system analyzing said acoustic tomography data transmitted by said acoustic tomography units and determining a region of interest within said ocean volume;
said processing and control system directing said underwater vehicle to move to said region of interest; and
sensing an ocean parameter in said region of interest with a sensor on said underwater vehicle and providing sensor data representative of said ocean parameter in said region of interest.

19. A method for adaptive oceanographic sampling as defined in claim 18 further including the step of transmitting acoustic energy from said underwater vehicle to the receiver array of one or more of said stationary acoustic tomography units.

20. A method for adaptive oceanographic sampling as defined in claim 18 further including the step of said underwater vehicle receiving acoustic energy transmitted from at least one of said acoustic tomography units.

21. A method for adaptive oceanographic sampling as defined in claim 18 wherein the step of directing said underwater vehicle includes directing said underwater vehicle to move to different depths and locations in said ocean volume.

22. A method for adaptive oceanographic sampling as defined in claim 18 further including the steps of said underwater vehicle storing said sensor data, said underwater vehicle docking at one of said acoustic tomography units, said underwater vehicle transferring said stored sensor data to said one of said acoustic tomography units and said one of said acoustic tomography units transmitting said stored sensor data.

23. A method for adaptive oceanographic sampling as defined in claim 18 wherein the step of analyzing said acoustic tomography data and determining said region of interest includes determining different regions of interest at different times and wherein the step of directing said underwater vehicle includes directing said underwater vehicle to move to said different regions of interest.

24. A method for adaptive oceanographic sampling as defined in claim 18 wherein the step of sensing said ocean parameter includes sensing temperature, conductivity and pressure in said region of interest.

25. A method for adaptive oceanographic sampling as defined in claim 18 wherein the step of analyzing said acoustic tomography data and determining said region of interest includes determining a relatively high spatial gradient of the ocean characteristic represented by said acoustic tomography data.

26. A method for adaptive oceanographic sampling as defined in claim 18 wherein the step of analyzing said acoustic tomography data and determining said region of interest includes determining a portion of said ocean volume where said ocean characteristic meets a predetermined criteria.

* * * * *

UNITED STATES PATENT AND TRADEMARK OFFICE
CERTIFICATE OF CORRECTION

PATENT NO.   : 5,687,137

DATED        : November 11, 1997

INVENTOR(S)  : Henrik Schmidt and James G. Bellingham

It is certified that error appears in the above-identified patent and that said Letters Patent is hereby corrected as shown below:

Cover page,
 item [22], change filing date from "Jan. 10, 1996" to -- Nov. 7, 1996 --.

Signed and Sealed this

Twenty-fourth Day of February, 1998

Attest:

BRUCE LEHMAN

*Attesting Officer*         *Commissioner of Patents and Trademarks*